No. 637,527.  
F. H. RICHARDS.  
WEIGHING MACHINE.  
(Application filed June 24, 1896.)  
Patented Nov. 21, 1899.

(No Model.) 4 Sheets—Sheet 1.

Witnesses:  
J. L. Edwards Jr.  
Fred. J. Dole.

Inventor:  
F. H. Richards.

No. 637,527. Patented Nov. 21, 1899.
F. H. RICHARDS.
WEIGHING MACHINE.
Application filed June 24, 1896.

(No Model.) 4 Sheets—Sheet 3.

Witnesses.
A. B. Mattingly
R. W. Pittman

Inventor.
F. H. Richards

No. 637,527. Patented Nov. 21, 1899.
F. H. RICHARDS.
WEIGHING MACHINE.
(Application filed June 24, 1898.)

(No Model.) 4 Sheets—Sheet 4.

Witnesses:
J. L. Edwards Jr.
Fred. J. Dole.

Inventor:
F. H. Richards.

UNITED STATES PATENT OFFICE.

FRANCIS H. RICHARDS, OF HARTFORD, CONNECTICUT, ASSIGNOR, BY MESNE ASSIGNMENTS, TO THE NEW ENGLAND AUTOMATIC WEIGHING MACHINE COMPANY, OF PORTLAND, MAINE.

WEIGHING-MACHINE.

SPECIFICATION forming part of Letters Patent No. 637,527, dated November 21, 1899.

Application filed June 24, 1896. Serial No. 596,731. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing apparatus, and especially to a combination of meter and weigher mechanisms adapted for weighing with rapidity and precision determined quantities of grain or other relatively free-flowing materials, the main object of the invention being to first measure approximately complete loads in separately-dischargeable chambers of a suitable meter and to subsequently deliver such measured loads separately to corresponding buckets of an automatic weighing mechanism, the difference between the supply delivered by the meter and the full quantity required to make up a complete load in each bucket being supplied, preferably, by suitable valve mechanism, such as a drip-valve, of suitable construction.

Figure 1:
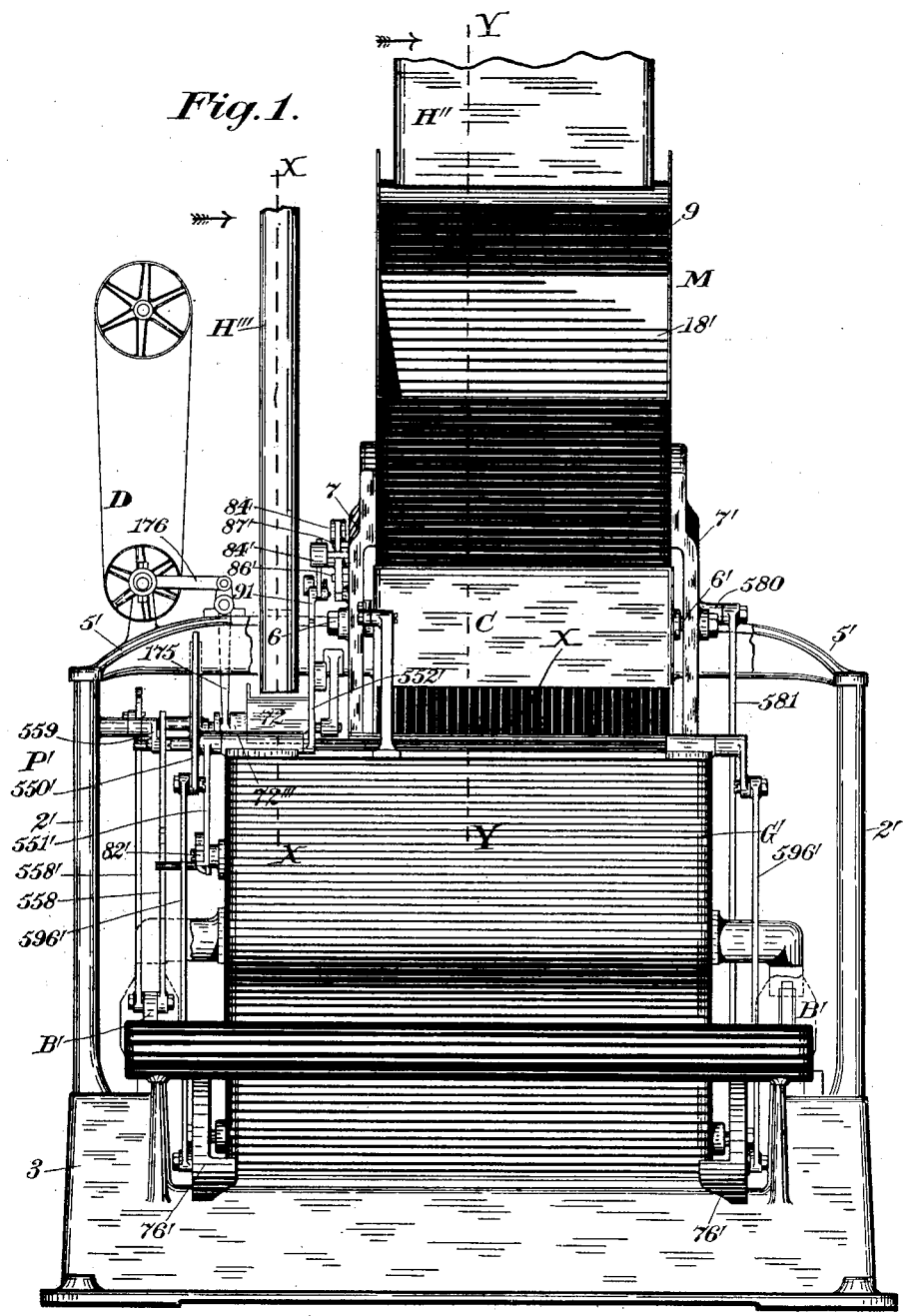
Figure 2:
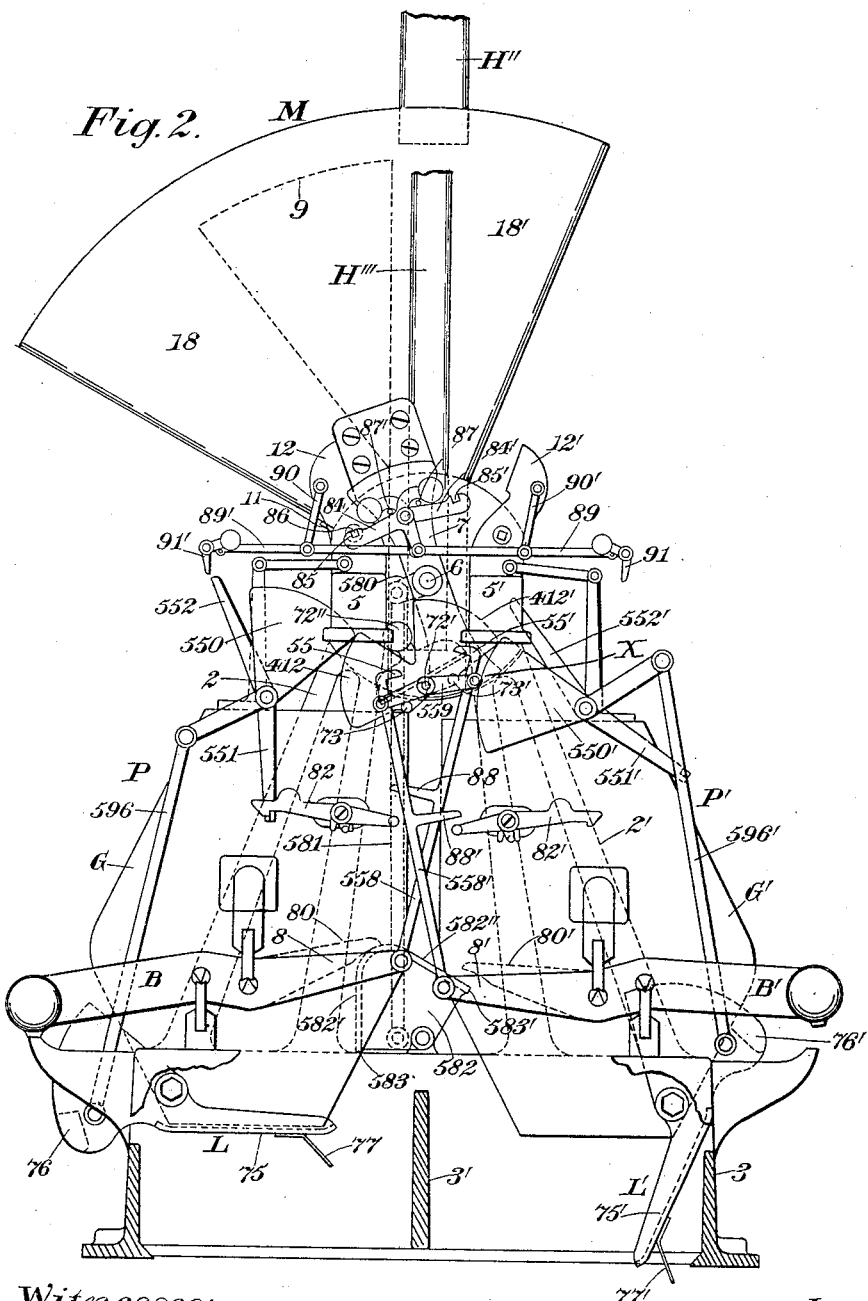
Figure 3:
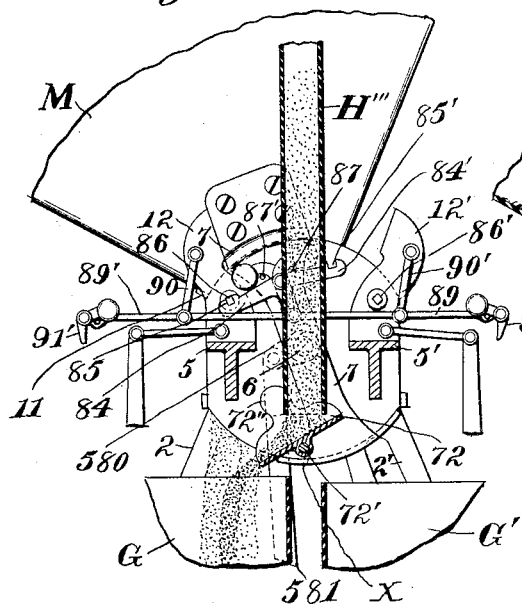
Figure 4:
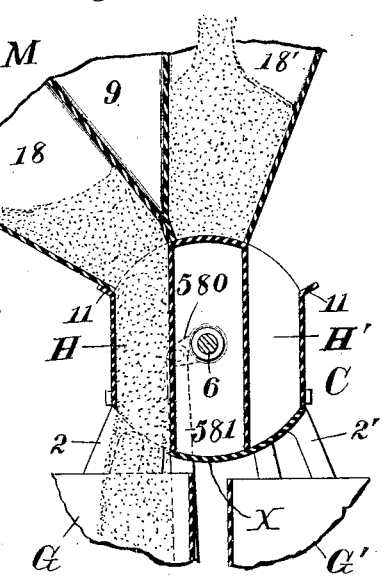
Figure 5:
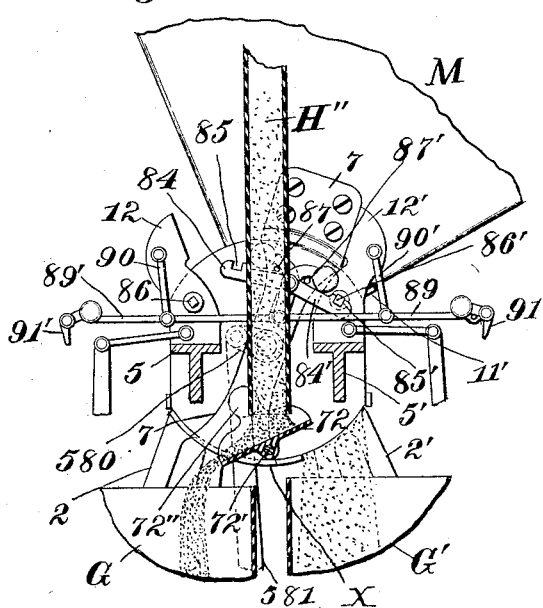
Figure 6:
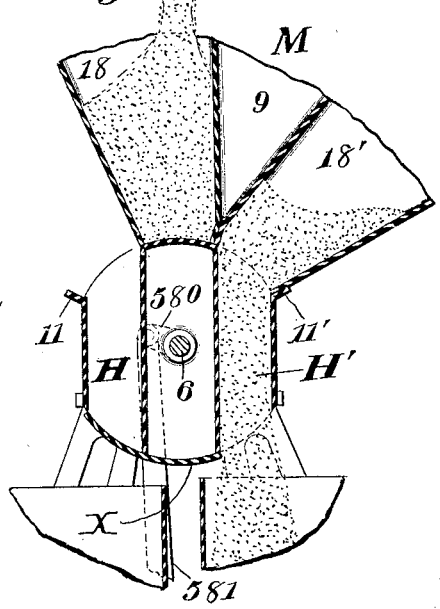
Figure 7:
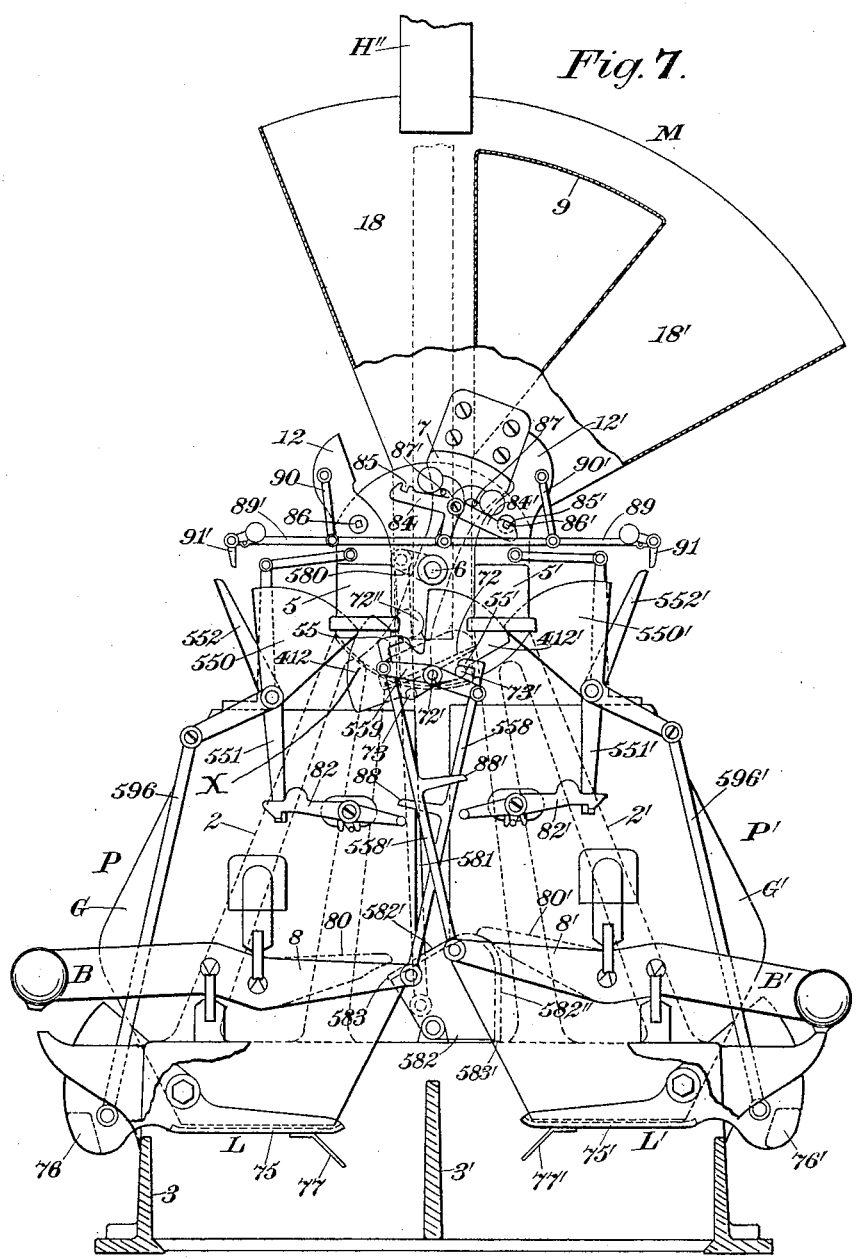

In the drawings accompanying and forming part of this specification, Figure 1 is an end elevation of a weighing apparatus constructed in accordance with my present invention, the view being taken looking from the right in Fig. 2. Fig. 2 is a sectional side elevation of the same, showing a meter and two weighing-machines, the machine on the right being represented as having discharged its load, while in that on the left the load is being made up. Figs. 3, 4, 5, and 6 are sectional detail views on the lines $x\,x$ and $y\,y$ of Fig. 1. Fig. 7 is a view similar to Fig. 2 and illustrates the positions of the parts just prior to the discharge of the left-hand weighing-machine and at the beginning of the operation of loading the right-hand one of said machines.

Similar characters designate like parts in all the figures of the drawings.

The framework for supporting the operative parts of my improved weighing apparatus may be of any suitable construction, and is illustrated herein embodying a chambered supporting-base 3, having a central vertical partition 3' for separating the base into two discharge-chutes, side frames or uprights for a pair of weighing-machines, the uprights at the forward sides of the machine being designated, respectively, by 2 and 2', and top plates or beams 5 and 5', connecting the side frames of the respective weighing-machines. These top plates are illustrated supporting a casing (designated in a general way by C) having a pair of supply spouts or chutes H and H' controlling the supply of material to the buckets of the respective weighers, it being understood that the casing C should be a strong and rigid structure firmly secured to the top plates by bolts or similar securing devices.

At the opposite ends of the casing C studs or trunnions are shown at 6 and 6', extending therefrom in position to carry for oscillation thereon a pair of oscillatory meter-supporting arms, which are represented at 7 and 7', rigidly secured at their upper ends to opposite sides of a meter having a plurality of chambers for supplying material to the chutes H and H', whence the respective streams are delivered into the buckets of the weighing-machines. This meter is designated in a general way by M and is shown herein as shiftable or oscillatory about an axis passing through the trunnions 6 and 6' and preferably has two diverging measuring-chambers 18 and 18' connected at their upper ends, as by means of the wall 9, which in the present instance separates the measuring-chambers, this wall being somewhat below the upper edges of the receiving end of the meter for the purpose of preventing overflow of the material when the meter swings from one to another of its positions.

For furnishing material to the compartments of the meter successively any suitable source of supply may be employed—such, for example, as the main supply-conduit H'', (shown in the drawings,)—the lower end of which will preferably dip slightly below the receiving end of the meter, so as to prevent spilling of the material discharged therefrom.

It will be obvious that the chambers of the meter M will be separately dischargeable and that while the load which has been completed in one compartment is being discharged therefrom the load in the other chamber will be made up, the discharge-mouth of such second chamber being at that time closed by the cut-off valve which connects the delivery-spouts H and H'. This valve is represented at 10 as a curved stream-supporting plate having its arc struck from the center of movement of the meter, and the discharge end of the meter is also preferably defined by an arc concentric therewith, so that as the meter swings back and forth to measure the charges in its compartments alternately said cut-off valve will close the discharge-mouths of said compartments in alternation and thereby permit the measuring of a charge in one chamber while that in the other is being emptied through its respective delivery-mouth.

It should be stated here that the mouths the compartments 18 and 18', the receiving of ends of the delivery-spouts H and H', and the valve 10 are all defined by substantially equal arcs, so that when the meter is in either of its extreme positions, in which it will be held by stops, such as 11 and 11', the mouth of the discharging-chamber will register with the receiving end of its delivery-spout, while the mouth of the other compartment will be covered by the plate 10. The stops 11 and 11' have been described as operative for determining the extreme positions of the meter M; but for the purpose of positively stopping a member adapted to contain such large quantities of material as the compartments 18 and 18' are designed to measure it will be apparent that strong and heavy abutments will be required to withstand the shocks caused by the oscillation of the meter, and these are illustrated herein at 12 and 12' constituting stops adapted to engage the edges of the meter-carrying arms 7 and 7'.

As shown particularly in Figs. 2 and 7, the arms or plates 7 7', attached to each side of the meter, are extended below the casing C and are there connected to a plate-valve X, which moves with the meter and alternately opens and closes the discharge ends of the delivery-chutes H H' in the casing C. By this construction all danger of feeding material into the buckets surreptitiously by throwing it into the open passage-ways or chutes H or H' of the casing C or accidentally by leakage from the compartment of the meter being filled is avoided, and, furthermore, the plate-valve not only subserves the purpose of a valve, as stated, but also acts to guide and steady the meter during its oscillations, said plate-valve being curved to accord with the arc of movement of the meter and to conform to the lower portion of the casing C. It will also be noted that the upper portion of the casing containing the fixed valve 10 for closing the discharge ends of the chambers 18 18' of meter M is also curved to fit the lower portion of said meter and to act as a guide for the same. If some means were not provided for alternately closing the discharge ends of the chutes H H', material could be fed to either bucket after the metered load had been discharged or while its closer was open and loss would of course follow.

From the construction of the meter hereinbefore described it will be seen that each compartment when loaded is in a substantially vertical position and will tend to gravitate toward the delivery-spout, with which it is designed to coöperate, and hence it will be obvious that in order that it may operate properly some means must be provided for intermittently locking the meter in its respective positions while either chamber is discharging and the other is completing the measurement of its charge.

Any suitable automatic weighing mechanism may be employed in connection with the meter illustrated in this application, provided that said mechanism embodies a plurality of buckets loadable separately by the respective chambers of the meter. I prefer to employ, however, a pair of automatic weighing-machines, each substantially similar, except as hereinafter specified, to that described and claimed in Patent No. 548,840, granted to me October 29, 1895, to which reference may be had. These weighing-machines are of the "single-bucket" type or class, and two of these are illustrated herein at P and P' constructed and organized to coöperate, respectively, with the respective chambers of the meter. These machines are shown having buckets G and G', supported on beam mechanisms, (designated in a general way by B and B',) these beam mechanisms being represented as of the "single-beam" type and as having poising portions 8 and 8', adapted, respectively, for supporting their respective buckets. The usual V-shaped bearings and supports are illustrated for mounting the beams on the base of the apparatus and the buckets on the poising portions of such beams.

The closers for the buckets are designated in a general way by L and L' and are represented having the usual load-supporting plates or closers proper, 75 and 75', pivoted, respectively, adjacent to the lower outer sides of the buckets, counterweighted arms 76 and 76', adapted to return the closers to their normal or shut positions, and depending lips 77 and 77' for engaging the stream of material discharged from the buckets and preventing shocks to the closers when returned to their normal positions.

For the purpose of supporting the closers the toggle connections illustrated herein may be employed, said toggles being shown consisting of rockers 550 and 550', pivotally supported at the upper ends of the buckets, and connecting-rods 596 and 596', connected to said rockers and also to the closers.

For the purpose of preventing oscillation of the rockers 550 and 550' these are shown as having arms 551 and 551' extending therefrom on the sides of the rocker-pivots opposite such rockers, these rock-arms having stops or detents adapted to be engaged by weighted latches 82 and 82', pivoted on the sides of the buckets G and G', respectively. These latches are adapted in the present instance to be released by latch-trippers 88 and 88', which are represented fixed on connecting-rods 558 and 558', pivotally connected at their lower ends to the inner ends of the beams 8 and 8' and having at their upper ends lateral arms 55 and 55', adapted for operating a supplemental valve for supplying a dripstream to the buckets G and G' alternately. The connecting-rods 558 and 558' are shown pivotally secured near their upper ends to opposite ends of a guide-lever 559, loosely mounted for oscillation about an axis in line with the axis of the supplemental valve.

Each of the compartments of the meter hereinbefore described is intended to measure a charge approximately equal to the load that is to be weighed by the bucket, which it is adapted to serve, and the remainder of the bucket-load will preferably be delivered as a drip-stream, as is usual in this art; but in the present application I have illustrated novel means for supplying this drip-stream, such means being represented as a shiftable valve adapted for supplying the buckets G and G' alternately and preferably oscillatory to two positions, in one of which it will discharge the stream from one end of the valve into one bucket and in the other of which it will deliver the drip-stream from its opposite end into the other load-receiver. This valve is designated herein by 72, and preferably has its axis of movement at 72' below the stream-supporting face of the valve and between the buckets of the two machines, said valve being shown having also a balance-weight, such as 72", which when the valve is oscillated in either direction beyond a vertical line passing through its axis of movement will serve to actuate the valve automatically to the limit of its oscillation in that direction. The valve 72 is also represented having a depending flange carrying a pair of stops, such as 73 and 73', which project into the path of movement of the arms 55 and 55' of the valve-actuators 558 and 558' and are so positioned that each valve-actuator will be operative to oscillate the valve at a predetermined point in the descent of the scale-beam to which it is connected—viz., at the moment at which the full load in the bucket is completed and the poising portion of the scale-beam has passed below the poising-line thereof. It will be apparent also that the latch-trippers 88 and 88' should be so positioned that they will not be effective to release their respective latches until the operation of the respective valve-actuators with which they coöperate has taken place.

As hereinbefore stated, one of the main objects of combining a meter having separate discharging-chambers with an automatic weighing mechanism having a plurality of separately-loadable buckets is to obtain greater rapidity as well as precision in the weighing operation, and hence I deem it essential to the proper operation of the apparatus herein illustrated to provide blocking means for alternately locking the poising mechanisms of the two weighing-machines against descent during the discharge of the respective meter-loads into the buckets into which they are adapted to be delivered.

A locking device suitable for blocking the descent of the poising portions of the scale-beams alternately, and hence the descent of the respective buckets carried thereby, is illustrated in the drawings as operative from the meter mechanism by the oscillation thereof, a rock-arm being represented at 580 having its axis of movement coincident with the axis of oscillation of the meter and pivotally connected at its free end with a connecting-rod 581, the lower end of which rod is pivotally secured to a blocking member or segment, such as 582, pivoted to the frame of the apparatus and preferably to the base 3 thereof between the weighing-machines, the axis of oscillation of the blocking-segment being shown in the drawings as in vertical alinement with that of the supplemental valve 72. This blocking-segment is also illustrated as preferably having symmetrical working faces 582' and 582" at opposite sides of the central longitudinal axis thereof and as having stop members or faces 583 and 583' adapted to abut against corresponding faces of the framework. The blocking-faces 582' and 582" are so disposed that they will coöperate alternately with a pair of blocking-arms 80 and 80', which are shown secured to the poising portions 8 and 8' of the respective scale-beams, the blocking-faces of the segment being illustrated herein as positioned to engage the under faces of the blocking-arms 80 and 80' alternately before the beam controlled thereby has begun its descent.

Load-discharging-movement limiters or closer-opening-movement limiters are represented at 412 and 412' connected for oscillation in unison about the axis of the supplemental valve 72, these limiters being preferably integral with each other and in fixed relation with said valve.

It will be apparent by reference to the drawings that the stop 412 and the closer-operated stop 550 constitute reciprocally-effective limiters controlling the movements of the valve 72 and the load discharger or closer L with respect to the weighing-machine P, while the valve-stop 412' and the rocker 550' constitute in a similar manner reciprocally-effective limiters for controlling the movements of said valve 72 and the load discharger or closer L' with respect to the weighing-machine P', so that it will be impossible for the loading of such machines to take place except in accordance with a predetermined sequence of movements of the parts controlling the supply of material to the buckets and the discharge of the same therefrom.

While I have shown in my present apparatus the load-discharging-movement limiters connected directly with closers for shutting the discharge-openings of the buckets, yet it is obvious that such devices could be applied to other styles of buckets—for instance, those not having closers—without departing from my invention.

As hereinbefore stated, some means must be employed for latching the meter M in its respective positions, and for this purpose a pair of meter-latches, such as 84 and 84', oscillatory about a common axis and supported on one side of the meter may be employed. These meter-latches are represented as counterweighted and as having detents 85 and 85', adapted to engage, respectively, squared stops 86 and 86' on the meter stops or abutments 12 and 12'. The extreme ends of the detents 85 and 85' are represented herein as rounded or sloping for the purpose of riding over the respective sides of the stops 86 and 86' and engaging said stops from beneath, stops being shown at 87 and 87' on the side of the meter for limiting the movements of said latches in one direction. The meter-latches are illustrated in the drawings as in the form of angle-levers having their short arms connected, respectively, with connecting-rods 89 and 89' for actuating said latches to release the same from their respective detent-pins 86 and 86' alternately, it being obvious that if the connecting-rod 89 is drawn to the right (see Fig. 2) the detent 85 will be released from the stop 86, while if the rod 89' is carried toward the left hand (see Fig. 7) the detent 85' will be released from the stop 86'. Guide-links are shown at 90 and 90' connected, respectively, with said connecting-rods and with suitable fixed members, such as the abutments 12 and 12', for maintaining the connecting-rods in substantially horizontal positions. Each of these rods is also shown carrying at its outer end a by-pass stop adapted to be operated by the closer from its respective machine for the purpose of releasing in the manner just described the meter-latch controlled thereby. These by-pass stops are designated herein as 91 and 91', respectively, and are illustrated as controlled by arms 552 and 552', movable, respectively, in unison with the respective rockers 550 and 550'.

It should be understood that an independent supply-spout will be provided for delivering the material to the valve 72, and this spout is shown herein at H''', it being apparent, of course, that the delivery of the material to said valve will be continuous and that the valve when not delivering a stream into one of the buckets will be furnishing it to the other. The stream of material flowing from such valve will be relatively small and will be the equivalent of the drip-stream usually employed for making up the last part of the load in automatic weighing-machines as usually constructed, the supplemental valve illustrated in the present application having a quick oscillatory or rocking movement, which will cut off the flow from one of its discharge edges with a rapid movement and will simultaneously cause the flow of the stream from the opposite discharge edge of the valve.

In addition to the oscillatory movement just described I prefer to provide means for axially reciprocating or shaking the valve 72, this shaking movement being imparted in the present instance by means of an oscillating lever 175, pivoted to one of the top plates of the machine and having its free end engaging the walls of a peripheral slot in an enlarged hub 72''', extending from the valve, movement being imparted to said lever by means of a crank-rod 176, operated by driving mechanism, (designated in a general way by D.)

The operation of a weighing apparatus constructed in accordance with my invention as herein set forth is as follows: It being assumed that the parts are in the positions shown in Fig. 2, it will be seen that the compartment 18 of the meter is delivering its charge through the delivery-spout H into the bucket G and that the chamber 18', the discharge end of which is closed by the valve 10, is being filled by the supply-stream from the main spout H'', also that the supplemental valve 72 is delivering a drip-stream into the bucket G while the main portion of the load is being supplied thereto. The bucket G' is represented in this view as having just discharged its load. At this time the meter-latch 84 is in engagement with the detent 86, the load-discharging-movement limiter 412 is in engagement with the rocker 550 and prevents the opening of the closer L, and the blocking-segment 582 is in engagement with the beam-arm 80 and forms a positive abutment for preventing the descent of the same, while the limiter 412' is held against oscillation by the rocker 550' of the weighing-machine P'. As soon as the beam mechanism B' returns from the position shown in Fig. 2 to that illustrated in Fig. 7 and the closer L' is shut, the rocker 550' is carried to the position shown in Fig. 7 and the stop 412' will be free to turn and therewith the valve 72, with which it moves in unison. The oscillation of the rocker 550' to the position shown in said Fig. 7 causes the arm 552' to strike the stop 91 and throw the connecting-rod 89 to the right, thereby releasing the meter-latch 84 from engagement with the detent 86, whereupon the weight of the charge in the compartment 18' will cause the meter to be turned to the right and the meter-latch 84' to be engaged by the detent 86', as shown in said Fig. 7. The oscillation of the meter causes the blocking-segment 582 to be withdrawn by the rod 581 from engagement with the beam-arm 80, and said blocking member is moved into position to block the descent of the beam 8' by engaging the under side of the arm 80' thereof. The beam mechanism B is now free, and the weight of the load in the bucket G will now cause said bucket and the poising portion of its beam mechanism to descend. At the moment of oscillation of the meter the discharge through the delivery-chute H was of course cut off and the charge in the compartment 18′ permitted to pass out through the delivery-spout H′, but the supply to the bucket G from the supplemental valve was not cut off. The drip-stream supplied by the valve 72 continues to flow into the bucket G during the descent of the poising mechanism of the weighing-machine P and until the arm 55′ engages the stop 73′ on the valve 72, whereupon the supplemental valve is oscillated to the position shown in Fig. 7 and with it the stop 412′, which then becomes effective to prevent the oscillation of the rocker 550′ and the closer L′. As soon as the full bucket-load is made up in the load-receiver G the valve 72 will be carried from the position shown in Fig. 7 into position to permit the opposite discharge edge thereof to deliver the supplemental supply-stream to the bucket G′, and the flow of the drip-stream into the bucket G will be thereby cut off entirely. As soon as this final cut-off of the drip-stream is effected, the latch-tripper 88 will be in position to release the bucket-latch 82, and the stop 412 will be oscillated to release the rocker 550 and permit the closer to open to discharge the load of the machine P. The parts will now be in position to pass through another cycle of operations, but in the reverse direction to that just described.

By the organization of a pair of automatic weighing-machines with an automatic gravitating meter in the manner herein stated I am enabled to produce a weighing apparatus in which the weighers will have a very much greater capacity than such machines would have if controlled by valve mechanism and interlocking devices of the usual construction, and this increase in capacity is obtained without affecting the precision with which the several weighing operations is performed.

No claim is made herein to the combination, with an oscillating meter, of automatic weighing mechanism having a plurality of buckets loadable by said meter and means operative by a part of the weighing mechanism for controlling the action of said meter; nor to the combination, with weighing mechanisms, of valve-opening-movement and load-discharging-movement limiters, as such subjects-matter are claimed in my Patent No. 632,660, dated September 5, 1899.

Having described my invention, I claim—

1. In a machine of the class specified, the combination, with framework, of a casing containing a delivery-chute; a movably-mounted meter; a valve movable with the meter and coöperating with said delivery-chute; means for latching said meter; weighing mechanism; and means controlled by a part of said weighing mechanism for releasing said meter.

2. In a machine of the class specified, the combination, with framework and with twin-bucket weighing mechanisms, of abutments secured to each side of the framework; a double-chambered meter movably mounted between said abutments; a casing containing delivery-chutes; a valve movable with said meter and coöperating with said delivery-chutes; means for automatically latching said meter; and means controlled by a part of each weighing mechanism for releasing the meter-latches.

3. In a machine of the class specified, the combination, with framework having top plates and having a casing with a curved top secured to said top plates, said casing containing delivery-chutes, of an oscillatory double-chambered meter pivoted between the top plates and shaped at its lower end to fit said casing; abutments rising from the top plates and adapted to receive the impact of the meter; a valve movable with the meter and coöperating with the delivery-chutes; latches for locking the meter in either of its extreme positions; weighing mechanisms; and means controlled by a part of each weighing mechanism for releasing said latches at the proper times.

4. In a machine of the class specified, the combination, with framework having top plates, of a casing having a curved top secured to said top plates; abutments rising from the top plates; a double-chambered meter; arms carried by said meter and connected to a rod journaled in the framework, said arms being adapted to engage the abutments on the extreme movements of the meter; a valve carried by said arms; counterweighted latches pivoted to said arms; stops carried by the abutments, with which said latches alternately engage; rods articulated to said latches and carrying by-pass devices; load-receivers; beam mechanisms; arms pivoted to the tops of said load-receivers; and rods connecting said arms with the closers of said load-receivers.

5. In a machine of the class specified, the combination, with framework, of a casing having delivery-chutes attached to the top thereof; an oscillatory multichambered meter mounted on the framework; a fixed valve secured to the top of the casing and adapted to close the bottom of each chamber of the meter while it is being filled; a valve for closing the lower ends of said delivery-chutes devices for latching the meter in either of its extreme positions; and means for releasing said latching devices.

6. In a machine of the class specified, the combination, with framework, of a casing having two delivery-chutes and a fixed valve; a double-chambered meter pivoted to the framework; a valve movable with the meter and serving to close the lower ends of said delivery-chutes; latches movable with the meter; stops on the framework, with which said latches engage; weighing mechanisms; and means controlled by a part of each weighing mechanism for releasing said latches.

7. In a machine of the class specified, the combination, with an oscillatory double-chambered meter, of a casing having delivery-chutes; a fixed valve secured to the casing and over which the meter oscillates; and a valve for alternately closing the lower ends of the delivery-chutes in said casing.

8. In a machine of the class specified, the combination, with framework, of a casing curved at its top and bottom secured to said framework and containing delivery-chutes; a fixed valve constituting a part of said casing; an oscillating double-chambered meter curved at its lower end to conform to the shape of the casing; and a curved plate-valve secured to and movable with the meter and adapted alternately to close the lower ends of the delivery-chutes in said casing.

9. In a machine of the class specified, the combination, with twin-bucket weighing mechanisms, of a casing curved at its top and bottom and containing delivery-chutes communicating with the buckets of said weighing mechanisms; a double-chambered oscillatory meter; means for supplying the chambers of said meter with material; arms connected to each side of said meter; and a curved valve attached to the lower ends of said arms and adapted alternately to close the discharge ends of the chutes in said casing.

10. In a machine of the class specified, the combination, with framework having separated top plates, of a double-chambered oscillatory meter pivoted between said top plates; a casing containing delivery-chutes and having curved upper and lower ends mounted on the framework; a fixed valve constituting a part of said casing and adapted alternately to close the chambers of the meter; and a curved valve attached to and movable with the meter and adapted alternately to close the lower ends of the chutes in said casing.

11. In a machine of the class specified, the combination, with framework, of a casing with delivery-chutes, said casing having curved upper and lower ends and containing a fixed valve, and also having stops; a double-chambered oscillatory meter curved at its lower end to conform to the shape of the casing; abutments mounted on the casing for receiving the impact of said meter; a valve for closing the lower ends of the chutes in said casing, said valve being connected to and movable with the meter; means for latching the meter in either of its extreme positions; and means for releasing the meter-latches.

12. In a machine of the class specified, the combination, with framework having parallel separated top plates, of a casing containing delivery-chutes secured to said top plates; a fixed valve constituting a part of said casing; a double-chambered oscillatory meter pivoted to the framework of the machine; abutments carried by the top plates for limiting the movement of said meter in either direction; means for supplying material to the chambers of the meter; and means carried by and movable with the meter for alternately opening and closing the lower ends of the delivery-chutes in said casing.

13. In a machine of the class specified, the combination, with twin-bucket weighing mechanisms, of closers pivoted to the buckets; a casing containing delivery-chutes mounted on the framework, said casing also having a fixed valve; a double-chambered oscillatory meter for supplying material to the buckets of the weighing mechanisms; abutments carried by the framework for limiting the movement of said meter in either direction; means for latching the meter in either of its extreme positions; a valve for closing the lower ends of the delivery-chutes, and means controlled by the closers of the buckets, on their shutting movements, for releasing the meter-latches.

14. In a machine of the class specified, the combination, with framework, of beam mechanisms mounted thereon; load-receivers sustained by said beam mechanisms and each equipped with a pivoted counterweighted closer; a casing containing delivery-chutes for the supply of material to said load-receivers; a fixed valve carried by the casing; a movable multichambered meter coöperative with said casing; a valve movable with the meter and serving to close the discharge ends of said delivery-chutes; means for limiting the movement of said meter in either direction; means for latching the meter; and means controlled by the closers of the weighing mechanisms for releasing the latches of said meter.

15. In a machine of the class specified, the combination, with twin-bucket weighing mechanisms, of a multichambered meter for supplying measured loads alternately to the buckets of said weighing mechanisms; abutments for limiting the movements of the meter in either direction; a fixed casing carrying a valve, said casing having delivery-chutes; a valve movable with the meter for closing the lower ends of the delivery-chutes in the casing; means for latching the meter; and means controlled by a part of each weighing mechanism for releasing the meter-latches.

FRANCIS H. RICHARDS.

Witnesses:
FRED. J. DOLE,
GEO. A. HOFFMAN.